Dec. 27, 1960    W. H. FAULKNER, JR., ET AL    2,966,587
HYDROGEN MEASUREMENT
Filed Aug. 2, 1955                                  4 Sheets-Sheet 1

WILLIAM HARRISON FAULKNER JR.
WALTER R. ELLIS
*INVENTORS*

BY *Spencer E. Olson*
ATTORNEY

Dec. 27, 1960  W. H. FAULKNER, JR., ET AL  2,966,587
HYDROGEN MEASUREMENT
Filed Aug. 2, 1955  4 Sheets-Sheet 2

WILLIAM HARRISON FAULKNER JR.
WALTER R. ELLIS
*INVENTORS*

BY
*ATTORNEY*

Dec. 27, 1960 W. H. FAULKNER, JR., ET AL 2,966,587
HYDROGEN MEASUREMENT
Filed Aug. 2, 1955 4 Sheets-Sheet 3

WILLIAM HARRISON FAULKNER JR.
WALTER R. ELLIS
*INVENTORS*

BY
*ATTORNEY*

Dec. 27, 1960  W. H. FAULKNER, JR., ET AL  2,966,587
HYDROGEN MEASUREMENT
Filed Aug. 2, 1955                                    4 Sheets-Sheet 4

WILLIAM HARRISON FAULKNER JR.
WALTER R. ELLIS
INVENTORS

BY *Spencer E. Olson*
ATTORNEY

United States Patent Office 2,966,587
Patented Dec. 27, 1960

2,966,587
HYDROGEN MEASUREMENT

William Harrison Faulkner, Jr., Weston, and Walter R. Ellis, Boston, Mass., assignors to Tracerlab, Inc., Boston, Mass., a corporation of Massachusetts Filed Aug. 2, 1955, Ser. No. 526,038

6 Claims. (Cl. 250—43.5)

This invention relates to a method and apparatus for the measurement of hydrogen in hydrocarbons and more particularly to the determination of percentage hydrogen or hydrogen-to-carbon ratio in hydrocarbons.

The percentage hydrogen in a hydrocarbon, or the hydrogen-to-carbon ratio, are basic properties used by petroleum chemists in fundamental research work. High precision techniques based on combustion analysis have been used in this connection, a method requiring the services of a skilled chemist and considerable time. There are, however, many possible production applications in the petroleum industry which might use to advantage the routine determination of percentage hydrogen if a suitably fast and accurate method of measurement were available. In certain refining operations, for example hydroforming, the objective is to remove hydrogen to produce aromatics from paraffins and cycloparaffins, and in the solvent extraction of lube-oil stocks, aromatics are removed by selective solvents thus increasing the percentage hydrogen. These examples, which are only a small representation of possible applications and the fact that hydrogen is an index to the performance of petroleum fuels, indicate the desirability of a rapid and accurate method for measuring this basic property of liquid hydrocarbons.

An instrument has recently appeared for performing this function which makes use of the absorption characteristics of hydrocarbon to beta radiation obtained from the radioactive decay of strontium-90. These radiations, high speed electrons, are slowed down or absorbed in the hydrocarbon under analysis primarily by collision with the electrons contained in the materials located along their paths. Since hydrogen contains approximately twice as many electrons per unit weight as does any other light element, including carbon, it absorbs beta radiation more efficiently on a weight basis than do the other elements. The instrument incorporating this principle includes a radioactive source constructed to radiate equally in opposite directions. The beam from one side of the source first traverses a fixed absorber, the radiation unabsorbed therein entering an ionization chamber arranged to collect negative electric charge on the central electrode. The beam of radiation from the other side of the source traverses a cell holding the sample to be analyzed, and a wedge-shaped absorber, before entering a second ionization chamber energized to collect positive electric charge on the central electrode. The two central electrodes of the ionization chamber are connected to a null detector circuit to indicate the difference in magnitude of the currents produced in the two ionization chambers. In operation, with the sample in place, the wedge is moved until equal currents are produced in the two chambers, the position of the wedge providing an indication of the absorption in the sample. Beta ray absorption in hydrocarbons, while being a readily measurable function of hydrogen content is also affected by the density of the sample. Accordingly, the density of the hydrocarbon must be measured simultaneously with the absorption measurement described above, this being accomplished in the prior art instrument by a plummet and balance utilizing the weight displacement method.

After the wedge position reading is obtained, and the density measurement is independently made, and with the aid of a calibration curve for the instrument, it is possible to calculate for the weight of hydrogen per unit volume, the entire procedure requiring about five minutes per sample.

This represents a considerable saving in time over the combustion method, the analysis can be made by a semi-skilled technician, and the accuracy is sufficiently good for use in production control, but there are a number of characteristics inherent in the method and apparatus subject to improvement. For example, the requirement of making two independent readings introduces measurement errors, and the application of these readings to a calibration curve and the need for mental calculation to arrive at the desired quantity offer further possibilities for error. It is desirable, therefore, that these steps be eliminated so as to provide an instrument which directly indicates percentage hydrogen. Another disadvantage of the above-described apparatus, which stems from the fact that the displacement method is used for the measurement of density, is that it is adaptable only to hydrogen determination of liquid hydrocarbons. Thus, in situations where it is desirable to determine the percent hydrogen in solid and semi-solid (e.g., heavy tars), the prior art gauge cannot be used.

Another prior art device, also utilizing the principle of beta-particle absorption, for hydrogen determination is described in Analytical Chemistry 26, 359 (1954), and is likewise based on the fact that the ratio $S_H/a_H$ for hydrogen is very different from the $S/a$ ratio of the other lighter elements, where S is the absorption cross-section of the element and $a$ is the atomic number. The apparatus consists of two radioactive sources, two liquid-containing cells and two ionization chambers. In operation, one cell is filled with a reference liquid and the other with a static or flowing sample of the liquid to be analyzed. Beta particles from each source pass into the corresponding liquid cell where some are absorbed and the transmitted particles pass into the ionization chamber and produce ions which are collected, resulting in an electrical current flow in the chamber electrodes. The difference between the two ion currents is amplified and recorded, and from this measurement, together with a calibration curve, the hydrogen to carbon ratio can be calculated.

The authors of the Analytical Chemistry article in explaining the efficacy of their method have derived the following general equations which have been confirmed by applicants and which will be referred to hereinafter in explaining the operation of the herein disclosed invention:

$$I_A = a + bA + cA^2 \quad (1)$$

$$A = \rho\left(w_H \frac{S_H}{a_H} + w_C \frac{S_C}{a_C}\right) \quad (2)$$

Equation 1 shows the dependence of transmitted beta radiation, $I_A$, on the absorption cross-section, A, of the material, and Eq. 2 shows the factors which affect absorption cross-section. In Eq. 2, $S_H$ and $S_C$ are the absorption cross-sections of hydrogen and carbon, respectively, $a_H$ and $a_C$ are the atomic weights of hydrogen and carbon, and $w_H$ and $w_C$ are the weight fractions of hydrogen and carbon. The quantity $S/a$ for hydrogen is 0.922 and for carbon 0.566, this appreciable difference accounting for the success of this prior art method. It will be noted, however, that A (and consequently $I_A$) is a function of density, $\rho$, being more sensitive to $\rho$ than to $w_H$, and accordingly, a correction must be made for density variations. This involves the separate determination of density and the use of calibration curves, to arrive at an accurate measure of percent hydrogen.

In addition to the foregoing studies of the absorption of beta particles in matter, considerable work has been done on the measurement of backscattering of beta particles from various materials, the latter studies indicating that backscattering has a marked dependence upon atomic number or atomic weight of the material. The reported work on backscattering from hydrogen-carbon mixtures is very limited, however, but it is reported in Physical Review 93, 891 (February 1954), that the "decrease in backscattering (from organic compounds) is directly proportional to the hydrogen content and precise corrections can be made."

With an appreciation of the shortcomings of existing apparatus and techniques, applicants have as a primary object of the present invention to provide an improved method and apparatus for the determination of percent hydrogen in hydrocarbons.

Another object of the invention is to provide a method and apparatus for hydrogen determination which provides a direct reading of hydrogen content, eliminating the need for separate measurements and calculation.

Still another object of the invention is to provide a method and apparatus for the determination of percent hydrogen in hydrocarbons, whether the sample be liquid or solid.

Yet another object of the invention is to provide a method for hydrogen determination which gives a direct reading of hydrogen content independent of the density of the hydrocarbon.

The invention is based on the discovery that the absorption of beta particles by hydrocarbons is primarily a function of density, and to a lesser extent, a function of hydrogen-to-carbon ratio, and that the efficiency of backscattering of beta radiation from the hydrocarbon is primarily a function of hydrogen-to-carbon ratio and to a much lesser extent, a function of density. The absorption and backscattering measurements being different functions of density and hydrogen content, it has been found that the two measurements may be combined in such a way that the resultant is a function of only hydrogen content over a considerable range of percent hydrogen. The essentials of the apparatus embodying this discovery are a pair of ionization chambers, one being arranged to intercept beta radiation transmitted through a test sample from a radioactive source, and the other being arranged to intercept radiation backscattered from a test sample upon bombardment from a source of beta radiation. The ionization currents from the two chambers are combined in suitable circuitry such that the resulting current, which may be directly indicated on a meter, is a measure of the percent hydrogen in the sample.

Additional objects, features and advantages will be apparent, and a better understanding of the invention will be had from the following description read in connection with the accompanying drawings in which.

Figure 1:
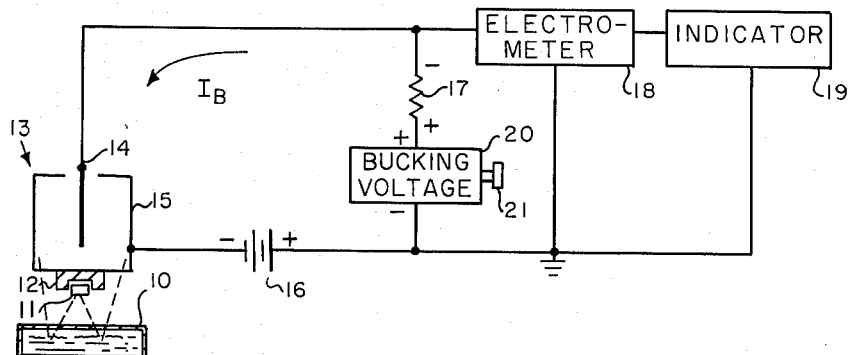
Fig. 1 is a schematic diagram of apparatus used in making measurements of radiation backscattered from hydrocarbon samples.

As was noted above, the present invention is based on the discovery that the absorption and backscattering of radiation in hydrocarbons are different functions of the hydrogen content and density over the range where measurement of percent hydrogen has particular utility. The data relative to the absorption of radiation in hydrocarbons reported in the Analytical Chemistry article cited above were closely substantiated by applicants' investigation, the results of which will be further alluded to hereinafter. In the investigation of the effect of percent hydrogen and density of the hydrocarbon on backscattering, a number of pure hydrocarbons and mixtures thereof were studied, using apparatus of the type generally illustrated in Fig. 1. The sample being investigated was placed in a container 10 of fixed thickness, and radiation from a radioactive source 11 directed into the sample. The radiation backscattered from the sample was intercepted by ionization chamber 13, having an outer electrode 15 and center electrode 14, and a filling of ionizable gas at a suitable pressure. Without describing in detail the operation of the ionization chamber, which is now well-known, radiation entering the chamber is converted to an electric current, $I_B$, the magnitude of which is directly proportional to the amount of intercepted backscattered radiation. This current may be measured in any suitable manner, a satisfactory circuit for this purpose being schematically illustrated in Fig. 1. In the disclosed system, a negative potential is applied to the outer electrode 15 from battery 16, producing an ion current, $I_B$, which flows in the direction indicated, when the chamber is subjected to ionizing radiations. This current flows through load resistor 17, in most cases of high value (e.g. $10^9$ to $10^{12}$ ohms), the magnitude of the current being obtained by measuring the voltage developed across the resistor by means of a suitable electrometer 18. The electrometer may consist of an electrometer tube having high input impedance, followed by a suitable current meter, diagrammatically illustrated at 19. In order that the electrometer measure only variations in the voltage developed across load resistor 17, and to thus extend its range of operation without overloading, a source of bucking voltage 20 is connected in series with the load resistor 17, and is of a polarity to oppose the voltage developed across the resistor.

To determine the dependence on percentage hydrogen and density on backscattered radiation, a family of hydrocarbons having different weight fractions of hydrogen, $w_H$, were individually measured in the apparatus of Fig. 1. To aid in the separation of the variables, $w_H$ and $\rho$, two hydrocarbon mixtures designated A and B, respectively having the same $w_H$ and density as cyclohexane were also investigated. The results of this investigation are summarized in the following table:

| Hydrocarbon | Formula | $w_H$ | $\rho$ at 20° C. | Relative change in $I_B$ | Total Current ×10⁻⁹ amps. |
|---|---|---|---|---|---|
| Benzene | $C_6H_6$ | 0.0775 | 0.8794 | 6.03 | 2.3963 |
| O-Xylene | $C_8H_{10}$ | 0.0948 | 0.8745 | 5.40 | 2.3840 |
| Cumene | $C_9H_{12}$ | 0.1031 | 0.864 | 5.02 | 2.3802 |
| p-Cymene | $C_{10}H_{14}$ | 0.1082 | 0.857 | 4.79 | 2.3779 |
| Cyclohexene | $C_6H_{10}$ | 0.1289 | 0.8102 | 3.66 | 2.3666 |
| Mixture B | | .1132 | .779 | 5.39 | 2.3839 |
| Mixture A | | .1438 | .694 | 2.52 | 2.3552 |
| Cyclohexane | $C_6H_{12}$ | 0.1438 | 0.7791 | 1.98 | 2.3448 |
| n-Octane | $C_8H_{18}$ | 0.1584 | 0.7036 | 0.80 | 2.3380 |
| n-Pentane | $C_5H_{12}$ | 0.1677 | 0.626 | 0.000 | 2.3300 |

Figure 6:
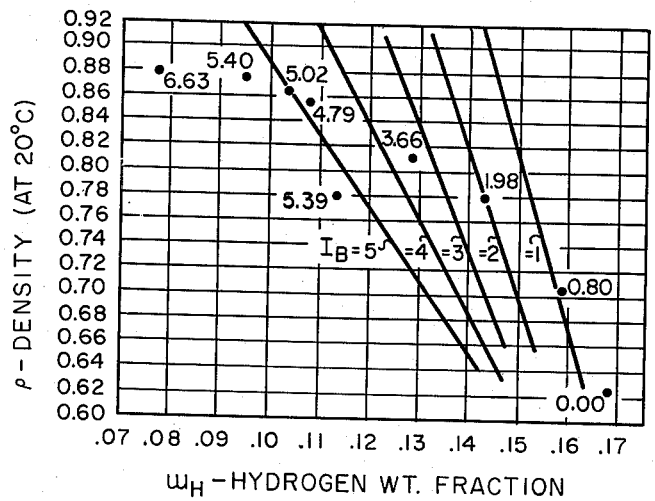
Fig. 6 is a family of curves illustrating the dependence of backscatter current on the density and percent hydrogen of a number of hydrocarbon samples.

The results contained in the above table are graphically demonstrated in Fig. 6, which is, in effect, a "contour map" of increments of backscatter currents, $I_B$, plotted against density $\rho$, and hydrogen weight fraction, $w_H$. The representation of Fig. 6 resembles the more familiar presentation of electron tube characteristics, the curve in the graph being lines of constant backscatter current, $I_B$. It will be noted that the backscatter current is a function of both $\rho$ and $w_H$, but more strongly a function of $w_H$.

Figure 7:
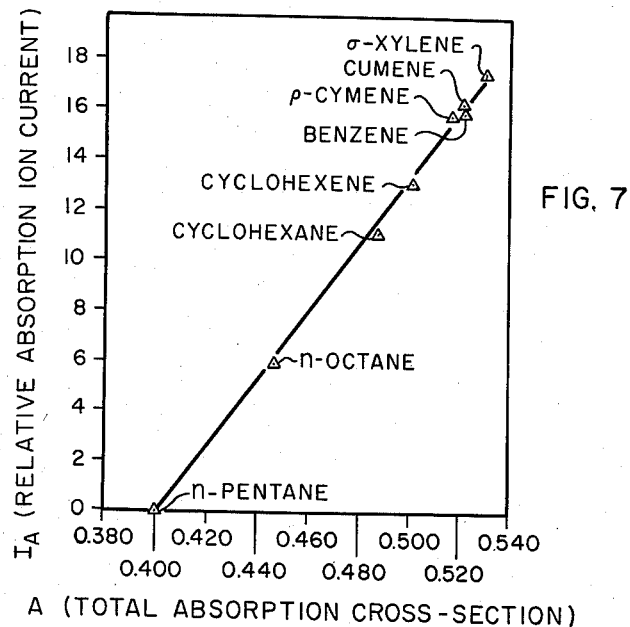
Fig. 7 is a curve showing the dependence of absorption current on the absorption cross-section of typical liquid hydrocarbons.

Applicants have also determined, using apparatus comparable to that described in the above-mentioned Analytical Chemistry article, that the absorption current, $I_A$, for the same family of hydrocarbons is very nearly a linear function of the absorption cross-section, A, of the hydrocarbon, the results of this determination being plotted in Fig. 7. As was noted earlier the absorption cross-section of a hydrocarbon may be designated by the following expression:

$$A = \rho \left( w_H \frac{S_H}{a_H} + w_C \frac{S_C}{a_C} \right) \quad (2)$$

in which $\rho$ is the density of the hydrocarbon, $w_H$ and $w_C$ are the weight fractions of hydrogen and carbon, respectively, $S_H$ and $S_C$ are the absorption cross-sections of hydrogen and carbon, respectively, and $a_H$ and $a_C$ are the atomic weights of hydrogen and carbon, respectively. From Equation 2 it will be seen that absorption in a hydrocarbon is a first order effect of density, but is also dependent on the percent hydrogen.

Reviewing the foregoing data, as depicted in Figs. 6 and 7, both the absorption and backscattered currents are dependent on both density and percent hydrogen, but to different degrees. The recognition of this fact, and the realization that density effects can be automatically conceled by the proper combination of absorption and backscatter current provide the basis of the present invention. From the observed data, the coefficients $a_\rho$, $a_H$, $b_\rho$ and $b_H$ can be defined as follows:

$$b_\rho \equiv \left( \frac{\partial I_B}{\partial \rho} \right)_{w_H} \quad b_H \equiv \left( \frac{\partial I_B}{\partial w_H} \right)_\rho$$

$$a_\rho \equiv \left( \frac{\partial I_A}{\partial \rho} \right)_{w_H} \quad a_H \equiv \left( \frac{\partial I_A}{\partial w_H} \right)_\rho$$

To a first approximation (linear) the following equations can be written for $I_B$ and $I_A$:

$$I_B = b_0 + b_\rho \rho + b_H w_H \quad (3)$$

$$I_A = a_0 + a_\rho \rho + a_H w_H \quad (4)$$

Where $a_0$ and $b_0$ are constants. In accordance with the present invention, the two currents $I_A$ and $I_B$ are derived and combined in a simple analogue computer in such a way that the terms in $\rho$ cancel out. By subtraction of Equation 4 from Equation 3 there is obtained:

$$I_B - \frac{b_\rho}{a_\rho} I_A = \left( b_0 - \frac{b_\rho}{a_\rho} a_0 \right) + \left( b_H - \frac{b_\rho}{a_\rho} a_H \right) w_H \quad (5)$$

and solving for $w_H$, the quantity sought to be indicated, $$w_H = \frac{(I_B - b_0) - \frac{b_\rho}{a_\rho}(I_A - a_0)}{b_H - \frac{b_\rho}{a_\rho} a_H} \quad (6)$$

Simplifying Equation 6, one can write:

$$w_H = K_1 + K_2 I_B - K_3 I_A \quad (7)$$

where the constants $K_1$, $K_2$ and $K_3$ can be computed from Equation 5 or 6 using the data contained in the foregoing table and Figs. 6 and 7. Thus it is seen, that the backscatter and absorption currents derived from a particular sample may be linearly combined directly to indicate the percent hydrogen in the hydrocarbon, such indication to a first approximation, being independent of density.

Figure 2:
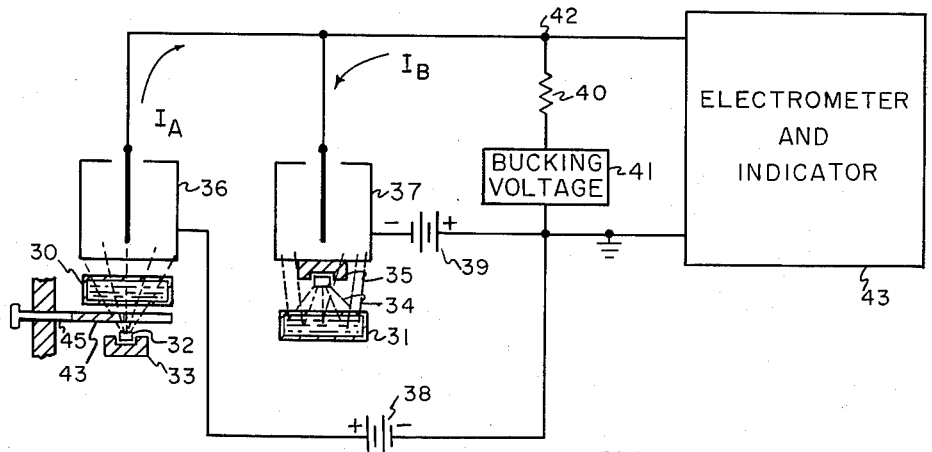
Fig. 2 is a schematic diagram illustrating a basic form of apparatus embodying the invention.
Figure 2A:
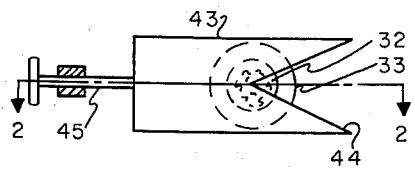
Fig. 2A is a plan view of a portion of Fig. 2.

Referring now to Figs. 2 and 2A, there is schematically illustrated a basic circuit for directly combining the absorption and backscatter currents in the manner described above. Instead of using a single sample cell as in Fig. 1, a quantity of the hydrocarbon to be analyzed is introduced into each of two sample-containers 30 and 31 wherein the absorption and backscatter properties, respectively, of the sample are measured. Both containers preferably have their walls fabricated of low Z material, such as aluminum, to minimize the absorption and reflection of beta radiation in the container. Both cells are filled to a predetermined level, cell 30 being sufficiently deep that the hydrocarbon causes appreciably absorption of beta radiation projected therethrough, and cell 31 is sufficiently deep that beta rays reflected from the bottom of the container are absorbed in their return journey and do not emerge from the surface of the medium where they entered. This dimensioning of the cells 30 and 31 insures that observed changes in absorption or backscatter current will not be caused by the variations in thickness of the sample, but will be dependent only on the hydrogen content and density. A first radioactive source 32, mounted in a suitable shielding container 33, is disposed to project radiations through cell 30, and a second source 34, mounted in container 35 is arranged to direct a beam of radiation into cell 31. Both of sources 32 and 34 are beta emitters, strontium-90 having suitable energy characteristics and half-life to be particularly useful. It will be understood, however, that other beta emitters may be used without departing from the spirit of the invention. Part of the radiations from source 32 are absorbed in the hydrocarbon contained in cell 30, as above-described, the unabsorbed radiations emerging from the opposite side of the cell and entering detector 36, illustrated as an ionization chamber. Beta particles from source 34 are directed into sample cell 31, part of which are backscattered from the hydrocarbon therein and enter a suitable current producing detector, such as ionization chamber 37. Chambers 36 and 37 are oppositely energized, a positive potential being applied to the outer electrode of chamber 36 from battery 38, and a negative potential being applied to the outer electrode of chamber 37 from battery 39. As a consequence, the ionization currents produced in the two chambers, under the influence of incident radiation, flow in opposite directions, as indicated by the arrows $I_A$ and $I_B$. As described above, these currents vary as a function of percent hydrogen and density of the hydrocarbon sample, the absolute values of the currents being dependent on the strength of sources 32 and 34, the dimensions of cells 30 and 31, the efficiency of detectors 36 and 37, etc.

To effect subtraction of $I_A$ from $I_B$, the inner electrodes of ionization chambers 36 and 37 are connected together and to one terminal of load resistor 40 whereby the currents $I_A$ and $I_B$ flow in opposite directions through the resistor. Accordingly, the voltage developed across resistor 40 is proportional to the algebraic sum of the two currents, and varies with $w_H$ in accordance with Equation 7. As in the circuit of Fig. 1, a source of bucking voltage 41 is connected in series with resistor 40 to adjust the operating potential at point 42 whereby only variations in the algebraic sum of currents $I_A$ and $I_B$ are measured, for example, by suitable electrometer and indicating circuitry diagrammatically indicated at 43. Voltage source 41 is preferably adjustable to provide a voltage of either polarity so as to obtain proper polarity at point 41 regardless of which of currents $I_A$ and $I_B$ is of larger absolute magnitude.

While the currents $I_A$ and $I_B$ are dependent on $w_H$ according to Equations 3 and 4 it will be appreciated that the magnitude of these currents may be appreciably different from each other. To provide adjustment of the relative absolute values of the currents $I_A$ and $I_B$ so that Equation 7 has practical constants, an adjustable absorber 43 may be placed between the source 32 and sample cell 30 to control the intensity of the beam entering the cell, and consequently the amount of unabsorbed radiation entering chamber 36. As best shown in Fig. 2A, the member 43 may consist of a strip of absorbing material adapted to stop beta radiation from the source, and having an aperture 44 of triangular shape. The absorber is mounted for movement across the source 32 in the direction indicated, under control of push-rod 45, whereby an adjustable fraction of the area of source 32 is exposed. Thus, with source 34 initially designed to give a suitable magnitude of backscatter current for the cell dimensions and geometry involved, absorber 43 may be adjusted to allow a beam of such intensity to enter cell 30 that the resulting absorption current when combined with the backscatter current will provide a suitable indication. Adjustment of the position of absorber 43 may also be used to advantage in compensating for possible difference in the rate of decay of the two sources, possible differences in temperature of the samples, or other variables which may detract from the precision of the instrument.

With proper adjustment of absorber 43 and a suitable value of bucking voltage for the chosen circuit parameters, indicator 43 may be calibrated in accordance with the function of Equation 7, and is thus capable of directly indicating the percent hydrogen in the sample under analysis.

Figure 3:
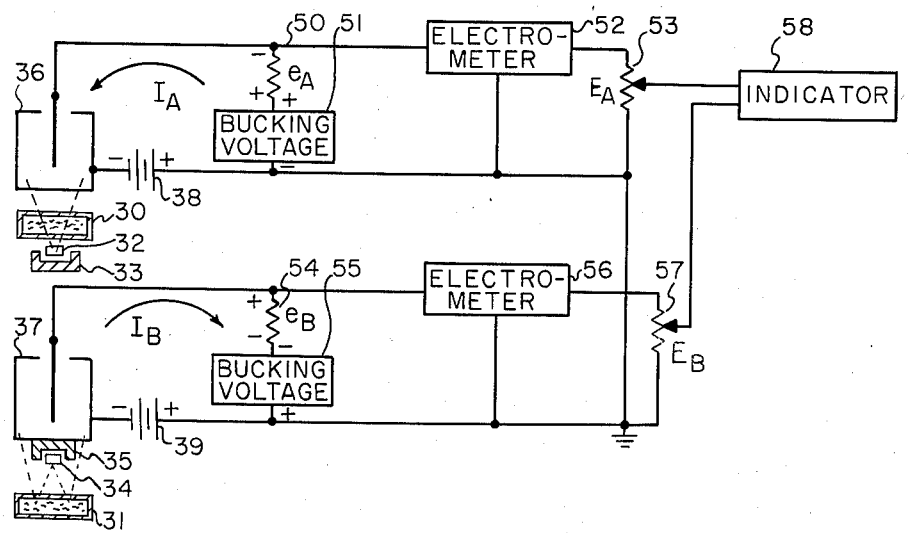
Fig. 3 is a schematic diagram similar to Fig. 2 and illustrating another form of combining circuitry.

Referring now to Fig. 3, a system similar to Fig. 2 is illustrated, differing therefrom, however, in the manner in which the currents from the two ionization chambers are combined. The arrangement of the radioactive sources, sample cells, and detectors are as described in connection with Fig. 2, except that the adjustable absorber is omitted, the function thereof being provided for in the combining circuitry. It will be noted also, that the polarities of batteries 38 and 39 are reversed from that illustrated in Fig. 2, with the result that the currents $I_A$ and $I_B$ flow in the opposite directions, this, however, being only an expedient in circuit design. Instead of combining the two currents in a single load resistor as is done in the circuit of Fig. 2, each is independently measured by a separate electrometer circuit to provide two voltages proportional to the currents, these voltages thereafter being combined and indicated to give a measure of percent hydrogen. To this end, a load resistor 50 is connected in circuit with ionization chamber 36, across which is developed a potential $e_A$, of the polarity indicated, proportional to the magnitude of the current $I_A$. A source of bucking voltage 51, having a polarity to oppose the voltage developed across the load resistor, is connected in series with resistor 50, the function of which has been fully described above. Variations in the magnitude of $e_A$ are measured in electrometer circuit 52 to provide a potential $E_A$ across potentiometer 53 which is a function of $e_A$ and, of course, $I_A$. Similarly, the backscatter current, $I_B$, develops a voltage $e_B$ across a second load resistor 54, which is opposed by a source of bucking voltage 55, the variations in which are measured in electrometer circuit 56 to produce a voltage $E_B$ across resistor 57 which is a function of $I_B$.

Having available the potentials $E_A$ and $E_B$, respectively functions of $I_A$ and $I_B$, it is possible, by adjustment of the movable taps on potentiometers 53 and 54, to select suitable functions of these potentials for combination and indication. In order that the combined currents afford a smooth function of percent hydrogen, it may be necessary to "weight" one in a different proportion than the other. This is accomplished in the circuit of Fig. 3, by selecting a suitable fraction of the potential $E_A$, e.g. a quantity $k'(E_A)$ for combination with a suitable function $k(E_B)$ of the potential $E_B$, such that upon combination in indicator circuit 58, a smooth function results. Thus, indicator 58 may be calibrated directly to indicate percent hydrogen, or a quantity which varies with percent hydrogen. This method of combination permits greater latitude of the strength of the two radiation sources, geometry effects, etc., than the arrangement of Fig. 2, and is therefore preferred in spite of the increased circuitry requirements.

Figure 4:
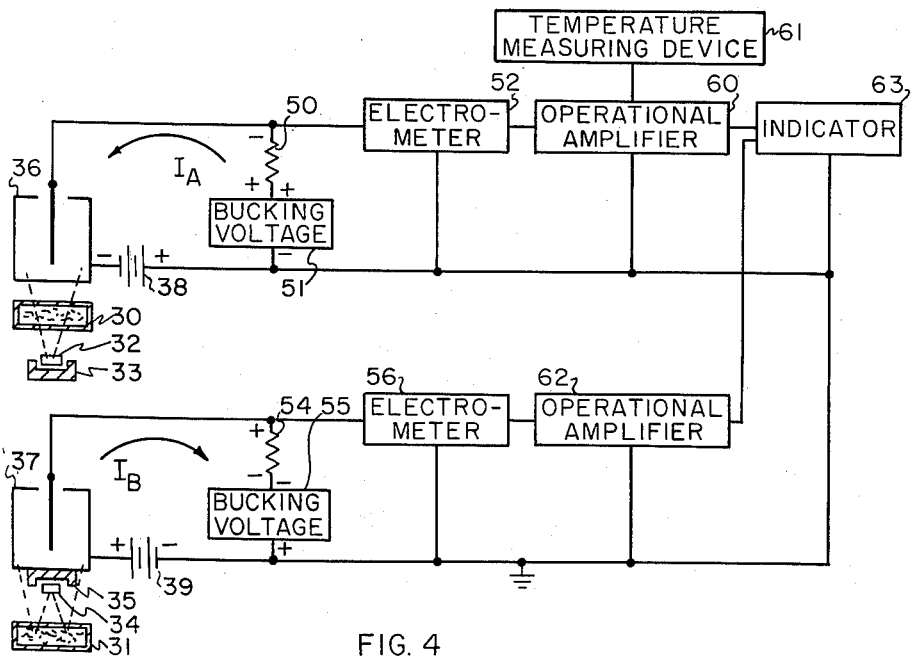
Fig. 4 is a schematic diagram illustrating still another form of combining circuitry.

Fig. 4 illustrates another embodiment of circuitry useful in the practice of the invention which may be utilized automatically to provide correction for errors in measured percent hydrogen which may result from other variables than density and percent hydrogen, and to permit combination of the measured quantities $I_A$ and $I_B$ in a fashion to give a desired scale of calibration on the indicator. This embodiment is similar to that of Fig. 3 up to the output terminals of electrometers 52 and 56, and a description of that portion of the circuit will not be repeated. The output $E_A$ of electrometer 52, a function of $I_A$, is applied to an operational amplifier 60, capable of producing an output which is some predetermined function of the input signal. For example, operational amplifiers are available which are capable of producing an output signal which may be the square of the input signal, the square root of the input signal, the sine of the input signal, etc. In the present circuit, the amplifier may be designed to convert the $E_A$ function to a straight line function, to permit simplification of the indicator circuit. Moreover, amplifier 60 may be designed to accept more than one input variable and produce an output signal which is a desired function of both variables. Correction of error introduced by variations in temperature, for example, can be compensated by introducing to amplifier 60 a signal $F(t)$ which is a function of temperature, as from temperature measuring device 61, the output signal derived from the amplifier therefore being a function of both $E_A$ and $t$.

The output signal $E_B$ from electrometer 56 is similarly coupled to a suitable operational amplifier 62, designed to provide an output signal $f(E_B)$ having a predetermined function of $E_B$. The output signals from amplifiers 60 and 62 are then combined in indicator circuit 63 which may be calibrated to indicate percent hydrogen directly.

While there has been illustrated means for compensating for changes in temperature, there may be other variables which can effect the accuracy of measurement, such as source strength decay, characteristics of the air column between the sources and detectors, and possible nonlinearity of Equations 3 and 4. That is $b$ and $b_H$ may be functions of $I_B$ and $a$ and $a_H$ may be functions of $I_A$, which would, of course, affect the precision of the instrument. Compensation for these variables may be achieved by introducing a signal proportional to the variable into one or both of amplifiers 60 and 62, or indicator 63, or generating a suitable signal within the amplifiers, the point of application being determined by the range and nature of the variable, the circuit parameters involved, etc.

Figures 5, 8:
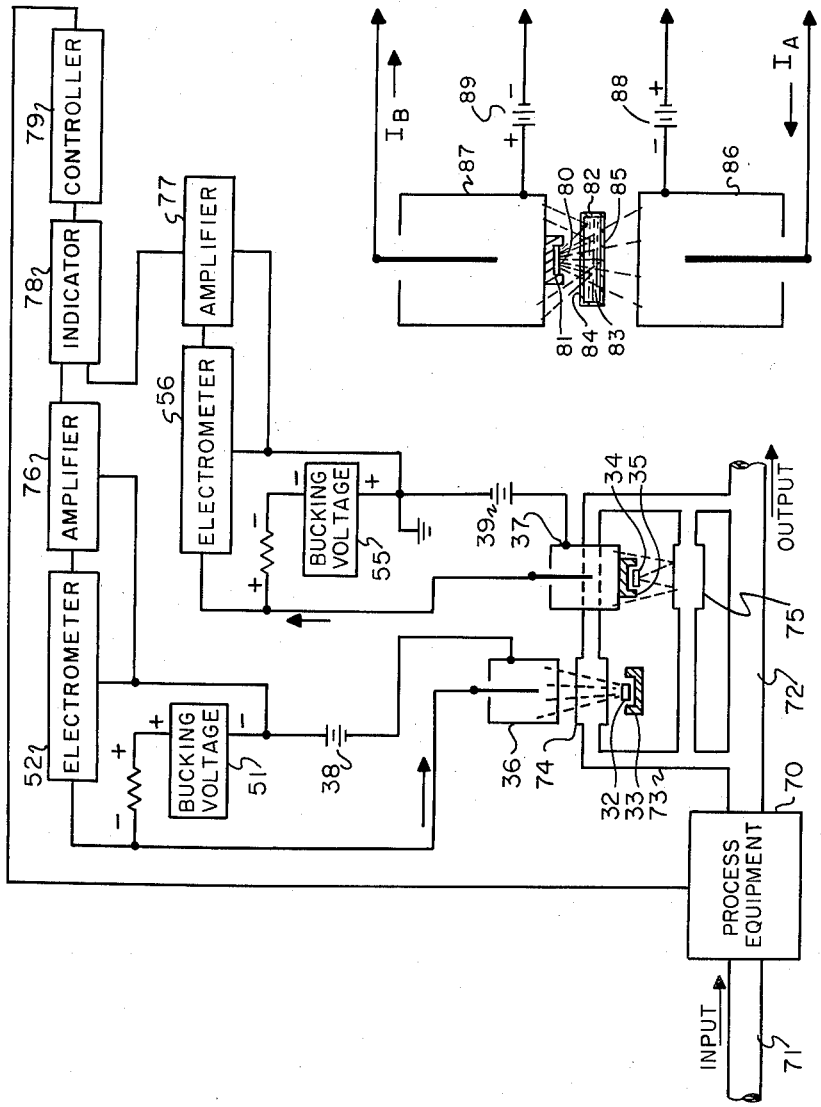
Fig. 5 is a schematic diagram showing the invention applied to the determination of percent hydrogen of a liquid hydrocarbon passing through process equipment.
Fig. 8 is a schematic diagram of an alternative arrangement of source and detector for absorption and backscatter measurements.

Fig. 5 illustrates the system of the invention combined with process equipment to afford continuous control of the process particularly with respect to the percent hydrogen of the product. The process equipment is designated at 70, and may comprise, for example, hydroforming equipment or other apparatus for the treatment of hydrocarbons, the raw material being introduced at input line 71 and the product removed through conduit 72. Assuming a requirement that the percent hydrogen in the product flowing in conduit 72 be controlled, the apparatus is coupled thereto to provide continuous flow of the material through the sample-containing cells. To this end, a portion of the material flowing in conduit 72 is deviated through branch conduit 73, flows through sample cells 74 and 75, and thereafter is returned to the main conduit. Cells 74 and 75 are of the same general construction as cells 30 and 31 of Fig. 2, particularly in the materials of which they are constructed and the restrictions on thickness, and are connected in conduit 73 so as to be continuously filled to a predetermined depth. Variations in percent hydrogen of the moving material appear as variations in magnitude of ionization currents $I_A$ and $I_B$, just as in the static system described earlier, the output signals from electrometers 52 and 56 consequently being respectively functions of hydrogen content. The outputs of electrometers 52 and 56 may be amplified by amplifiers 76 and 77, respectively, or applied to an operational amplifier of the type described in connection with Fig. 4, and the resulting signal combined, as above described, to obtain a signal proportional to hydrogen content independent of density. This signal is indicated on indicator 78, and is also applied to controller 79, of which many types are commercially available. As is well known, the controller provides an output signal, or mechanical motion, which is coupled to a suitable control point in process equipment 70 thereby to alter the process to bring the percent hydrogen back to the desired value. If a single product is to be analyzed, it may be convenient to arrange the combining circuitry such that the output of controller 79 is zero at the desired percent hydrogen, and deviates therefrom with variations in percent hydrogen from the desired value, the control loop being arranged to introduce corrections so as to maintain the output at zero value. Many variations of servo loops will of course suggest themselves to one skilled in the art, and will depend to a large extent on the available control points in the process equipment. Accordingly, the system of Fig. 5 should be considered illustrative only, and not in a limiting sense.

While throughout the foregoing description an arrangement of two sources, two sample cells and two detectors has been considered, it may be preferable in some cases to employ the arrangement illustrated in Fig. 8. In this configuration, a single radioactive source 80 is used, being mounted in a suitable shielding container 81, and arranged to project radiation into a single cell 82 containing the sample 83 to be analyzed. As in the case of the two source arrangement, a beta emitting radioisotope is used, strontium-90 being particularly suitable. The windows 84 and 85 of the cell through which the radiation passes is formed of very thin, low Z material, such as aluminum, to eliminate as much as possible absorption of the radiation in the container. The cell 82 is sufficiently deep that an appreciable amount of the radiation is absorbed in the sample 83, the unabsorbed portion emerging from window 85 and entering ionization chamber 86. There is also scattering of beta radiation within the sample material, the backscattered radiation entering ionization chamber 87. The chambers 86 and 87 are oppositely energized from batteries 88 and 89, respectively, and provide output currents $I_A$ and $I_B$ respectively proportional to the absorption and backscattering of the sample material in the directions indicated. Measuring and combining circuitry have not been illustrated in Fig. 8, it being understood that any of the arrangements described in Figs. 2, 3, 4 and 5 may be used, depending upon the application and/or desired degree of accuracy.

It is thought that the invention and its advantages will be fully understood from the foregoing description, and it is obvious that numerous changes can be made in the form, construction and arrangement of the several parts without departing from the spirit or scope of the invention, or sacrificing any of its attendant advantages, the forms herein disclosed being preferred embodiments for the purpose of illustrating the invention.

What is claimed is:

1. Apparatus for directly measuring the percent hydrogen in a hydrocarbon the density of which varies with the percent hydrogen, which comprises means for directing a beam of radiation into a sample of the hydrocarbon of a thickness such that an appreciable portion of the radiation is absorbed in the hydrocarbon, means for measuring the radiation transmitted through the sample to obtain a first signal which varies primarily as a function of the density of the hydrocarbon and secondarily as a function of the hydrogen content of the hydrocarbon, means for separately and simultaneously measuring the radiation backscattered from the side of the sample into which the beam of radiation is directed to obtain a second signal which varies primarily as a function of the hydrogen content of the hydrocarbon and secondarily as a function of the density of the hydrocarbon, means for weighting said first and second signals in accordance with the respective dependence upon density and hydrogen content of hydrocarbons, and means for algebraically combining said weighted first and second signals, said weighted signals having such characteristics that upon algebraic combination the function of density of the hydrocarbon is canceled whereby a signal proportional to the percent hydrogen of the hydrocarbon is obtained independent of density.

2. Apparatus for directly measuring the percent hydrogen in a hydrocarbon the density of which varies with the percent hydrogen, which comprises means for directing a beam of beta radiation into a sample of the hydrocarbon of a thickness such that an appreciable portion of the radiation is absorbed in the sample, and the amount of radiation transmitted therethrough varies primarily as a function of the density of the hydrocarbon and secondarily as a function of the hydrogen content of the hydrocarbon, means for simultaneously measuring the beta radiation backscattered from the side of the sample into which the beam of radiation is directed which varies primarily as a function of the hydrogen content of the hydrocarbon and secondarily as a function of the density of the hydrocarbon, means for continuously weighting said measurements in accordance with the respective dependence upon density and hydrogen content of hydrocarbons, and means for continuously and algebraically combining said weighted measurements, said weighted measurements having such characteristics that upon combination the function of density of the hydrocarbon is canceled whereby a measurement of hydrogen content compensated for changes in density is obtained.

3. Apparatus for the direct measurement of the percent hydrogen in a hydrocarbon, comprising a shallow container for receiving a sample of a hydrocarbon to be analyzed the density of which varies with the hydrogen content thereof, a source of beta radiation arranged to direct a beam of radiation into one side of said container, the depth of the hydrocarbon in said container being such as to absorb an appreciable portion of the radiation directed thereinto with the radiation transmitted through the hydrocarbon varying primarily as a function of the density of the hydrocarbon and secondarily as a function of the hydrogen content of the hydrocarbon, and to backscatter an amount of radiation varying primarily as a function of hydrogen content of the hydrocarbon sample and secondarily as a function of the density thereof, a first current-producing radiation detector arranged to detect radiation transmitted through said sample, a second current-producing radiation detector arranged to detect radiation backscattered from the side of the container into which said beam of radiation is directed, means for weighting the outputs of both of said detectors in accordance with the respective dependence upon density and hydrogen content of hydrocarbons, and circuit means operative upon the outputs of said weighting means for producing a signal proportional to the hydrogen content of said hydrocarbon sample, independent of density.

4. Apparatus for the direct measurement of the percent hydrogen in a hydrocarbon independent of the variation of the density thereof with changes in its hydrogen content, comprising first and second shallow containers for containing the hydrocarbon to be analyzed, a first radiation source arranged to direct a beam of beta radiation into one side of said first container, the depth of the hydrocarbon in said first container being such as to absorb an appreciable portion of the radiation directed thereinto with the radiation transmitted through the hydrocarbon varying primarily as a function of the density of the hydrocarbon and varying secondarily as a function of the hydrogen content of the hydrocarbon, a second radioactive source arranged to direct a beam of beta radiation into one side of said second container wherein the depth of said hydrocarbon is such as to backscatter an amount of radiation varying primarily as a function of the hydrogen content of the hydrocarbon and secondarily as a function of the density thereof, a first current-producing detector arranged to detect radiation transmitted through said first container, a second current-producing detector arranged to detect radiation backscattered from the side of said second container into which the radiation is directed, means for weighting the outputs of both of said detectors in accordance with the respective dependence upon density and hydrogen content of hydrocarbons, and circuit means operative upon the outputs of said weighting means and arranged to derive a signal proportional to the hydrogen content of the hydrocarbon, independent of its density.

5. Apparatus as defined in claim 4 wherein said weighting and circuit means comprise a first electrometer circuit connected to said first detector and operative to generate a first signal proportional to the current output of said first detector, means for amplifying said first signal and operative to produce a second signal which is a weighted function of said first signal as aforesaid, a second electrometer circuit connected to said second detector and operative to generate a third signal proportional to the current output of said second detector, means for amplifying said third signal and operative to produce a fourth signal which is a weighted function of said third signal as aforesaid, and means for algebraically combining said second and fourth signals and arranged to derive a signal proportional to the hydrogen content of the hydrocarbon, independent of its density.

6. Apparatus for the direct determination of the percent hydrogen in a hydrocarbon independent of the variations in the density thereof with changes in hydrogen content, comprising a shallow container of a predetermined depth formed of a thin material relatively permeable to beta radiation for containing the hydrocarbon to be analyzed, a radioactive source disposed on one side of said container and arranged to direct a beam of beta radiation into said container, the hydrocarbon sample when filling said container being such as to absorb an appreciable portion of the radiation directed thereinto with the radiation transmitted through the hydrocarbon varying primarily as a function of the density of the hydrocarbon and varying secondarily as a function of the hydrogen content of the hydrocarbon and to backscatter an amount of radiation varying primarily as a function of the hydrogen content of the hydrocarbon and secondarily as a function of the density of the hydrocarbon, a first current-producing detector disposed on the side of said container opposite from said source arranged to detect radiation transmitted through the hydrocarbon in said container, a second current-producing detector disposed on the same side of said container as said source arranged to detect radiation backscattered from the hydrocarbon in said container, a radiation shield interposed between said radioactive source and said second detector to prevent direct radiation from said source entering said second detector, means for weighting the outputs of both of said detectors in accordance with the respective dependence upon density and hydrogen content of hydrocarbons, and circuit means operative upon the outputs of said weighting means arranged to derive a signal proportional to the hydrogen content of the hydrocarbon, independent of its density.

References Cited in the file of this patent
UNITED STATES PATENTS

| | | |
|---|---|---|
| 2,316,239 | Hare | Apr. 13, 1943 |
| 2,323,128 | Hare | June 29, 1943 |
| 2,651,726 | Froman et al. | Sept. 8, 1953 |